United States Patent [19]

Choate et al.

[11] Patent Number: 5,422,828
[45] Date of Patent: Jun. 6, 1995

[54] METHOD AND SYSTEM FOR IMAGE-SEQUENCE-BASED TARGET TRACKING AND RANGE ESTIMATION

[76] Inventors: William C. Choate, 6247 Twin Oaks Cir., Dallas, Tex. 75240; Rajendra K. Talluri, 7131 Woodhollow Dr., Apt. 108, Austin, Tex. 78731

[21] Appl. No.: 810,745

[22] Filed: Dec. 18, 1991

[51] Int. Cl.$^6$ ............................................. G01S 13/00
[52] U.S. Cl. .................................. 364/516; 342/458; 342/64
[58] Field of Search .................. 364/516, 174; 382/16, 382/37, 54, 10, 14, 23, 25, 28; 342/126, 458, 64; 250/201.6, 201.8, 202

[56] References Cited

U.S. PATENT DOCUMENTS

| | | | |
|---|---|---|---|
| 4,004,852 | 1/1977 | Pentecost | 250/201.6 |
| 4,700,307 | 10/1987 | Mons et al. | 342/64 |
| 4,855,932 | 8/1989 | Cangiani et al. | 364/516 |
| 4,916,302 | 4/1990 | Sorimachi | 250/201.6 |
| 4,954,837 | 9/1990 | Baird et al. | 342/458 |

*Primary Examiner*—Emanuel T. Voeltz
*Assistant Examiner*—Thomas Peeso
*Attorney, Agent, or Firm*—Robert L. Troike; Richard L. Donaldson

[57] ABSTRACT

A method of tracking targets across a sequence of images estimates the range of these tracked objects from the camera. The method assumes the motion of the camera between the successive frames is known. The distance from the sensor to the object is assumed to be much larger than the physical dimensions of the object. The method and system make use of the known sensor motion to generate "expected images" that are then used to establish a reliable correspondence and track the targets across the image sequence. The method and system use a mean/energy-normalized area correlation technique to establish inter-frame correspondence. With this correspondence, two new methods can estimate the range of the target from the sensor.

11 Claims, 5 Drawing Sheets

METHOD AND SYSTEM FOR IMAGE-SEQUENCE-BASED TARGET TRACKING AND RANGE ESTIMATION

TECHNICAL FIELD OF THE INVENTION

The present invention relates to electronic sensing methods and systems, and more particularly to a method and system for image-sequence-based target tracking and range estimation that tracks objects across a sequence of images to estimate the range to the tracked objects from an imaging camera.

BACKGROUND OF THE INVENTION

Passive ranging is an important area of applied computer vision research. In particular, many systems need methods to estimate ranges of objects from on-board sensors. Important applications of passive ranging methods exist where using active ranging methods is impossible or impractical, such as where power limitations or covert operations restrict active system operation. For example, passive ranging methods have significant application in the nap-of-the-earth helicopter guidance systems and for systems that perform autonomous planetary missions. See B. Sridhar & A. V. Phatak, "Simulation and Analysis of Image-Based Navigation System Rotorcraft Low-Altitude Flight," *AHS National Specialist's Meeting on Automation Applications of Rotorcraft*, Atlanta, Ga., Apr. 4–6, 1988.

A large number of computer vision researchers have considered the use of a visual image sequences to estimate object structures and sensor motion. See, e.g., J. K. Aggarwhal & W. N. Martin, "Dynamic Scene Analysis," in *Image Sequence Processing and Dynamic Scene Analysis*, ed. T. S. Huang, pp. 40–74 (Springer-Verlog 1983). By using a sequence of images, known methods may not only estimate the range of the objects from the sensor, but also some methods and systems can compute the motion of the sensor. J. K. Aggarwhal & N. Nandhakumer, "On the Computation of Motion from a Sequence of Images—A Review," Proceedings of the IEEE, pp. 917–35 (August 1988) (hereinafter "Aggarwhal"), for example, discusses various approaches for computing motion from a sequence of images.

Motion analysis techniques may be divided into two general categories: (1) optical-flow-based methods, and (2) feature-based methods. The optical-flow-based approaches compute an optic flow or two-dimensional field of instantaneous velocities of the gray values in the image plane. These methods then use the optic flow along with additional scene constraints to compute the structure of the scene and the motion of the sensor. See, e.g., B. G. Schunck *"Image Flow: Fundamentals and Algorithms,"* in *Motion Understanding: Robot and Human Vision*, eds. W. N. Martin & J. K. Aggarwhal (Norwell, Mass. 1988).

The feature-based methods extract a relatively sparse set of features of interest such as edges, lines, regions, etc., using a two-dimensional feature detector from the images. These methods then establish inter-frame correspondences between the features. Using constraints such as rigid-body motion, these methods compute sensor motion as a function of the correspondences between the three-dimensional structures that give rise to the features.

With the advent of accurate position determination systems such as Inertial Navigation Systems (INS) and Global Positioning Systems (GPS), it is now possible to compute quite precisely the motion of the sensor in the environment. Certain passive ranging methods use the known motion and only concentrate on computing the range of the objects of interest from the sensor. Aggarwhal, for example, describes these types of methods.

The feature-based methods that establish correspondences between sequential images of local features generally employ either intensity-based or token-based correspondence techniques. The intensity-based correspondence techniques assume that if the time difference between the generation of the two images is small, the intensity of the image of a specific feature is likely to be same in both the images. This assumption is also known as the intensity-constancy constraint. The intensity-based correspondence techniques may be further classified into gradient-based schemes and correlation-based schemes. Variations of intensity-based correspondence techniques appear, for example, in B. K. P. Horn, *Robert Vision*, Cambridge, Mass. 1986); and J. 0. Limb & J. A. Murphy, "Estimating the Velocity of Moving Images in Television Signals," *Computer Graphics and Image Processing*, Vol. 4, pp. 311–27 (1975).

Token-based correspondence techniques try to avoid the problems that arise when the intensity-based correspondence techniques violate an intensity-constancy constraint. Token-based correspondence techniques extract stable symbolic tokens from the images and attempt to match these tokens, instead of directly matching the intensities. The various tokens may have different degrees of complexity. Edges, lines, corners, and texture markings are some examples of the tokens that the token-based correspondence techniques use. See, e.g., J. Roach & J. K. Aggarwhal, "Determining the Movement of Objects from a Sequence of Images," *IEEE Trans.* on PAMI, pp. 554–62 (1980).

The above methods suffer from a significant limitation in that when the motion of the sensor is known a priori, the methods do not effectively use this information to extract features or establish correspondences. Both the intensity-based and the token-based correspondence techniques essentially depend only on the local grey scale changes. As a result, when the sensor moves considerably, the object image may change significantly.

When object images change significantly, the tokens that the token-based correspondence techniques extract for matching may be significantly different from previously extracted tokens. If sequential tokens are significantly different, correspondence procedures will not be reliable and resulting range estimates will be erroneous. For example, R. Dutta & M. A. Synder, "Robustness of Structure from Binocular Known Motion," *IEEE Workshop on Visual Motion*, (Princeton 1991) shows that small errors in correspondence may lead to large errors in the inferred motion and large errors in inferred depth. Even in the case when the motion is known a priori, small errors in image displacement may lead to large errors in depth for points more that a few multiples of the baseline from the sensor.

Similar problems plague the intensity-based methods. For example, with considerable sensor movements, object grey-value distributions in sequential images may be considerably different from the previous ones. This, again, will cause unreliable correspondence measurements and potentially erroneous range estimates.

In most passive ranging applications, the motion of the sensor is known a priori to a reasonable degree of accuracy. This knowledge of sensor motion may be used effectively to establish image correspondences and to improve range estimates. No known method or system effectively uses this information.

Thus, there is need for a method and system that overcomes many of the limitations associated with known passive ranging methods and system.

There is a need for a method and system that avoids the problems of known optic-flow and feature based passive ranging methods and systems.

A need exists for a method and system that provide, image-sequence-based target tracking and range estimation without the limitations of known intensity-based or token-based correspondence techniques.

There is a further need for a method and system for target tracking and passive range estimation that effectively uses available knowledge of sensor motion to establish image correspondences and to improve range estimates.

SUMMARY OF THE INVENTION

The present invention, accordingly, provides method and system for image-sequence-based target tracking and range estimation that overcomes or reduces disadvantages and limitations associated with prior passive ranging systems and methods.

One aspect of the present invention is a method for determining ranges to objects in a scene using images formed at several times. The first step of the method includes selecting from an initial image one or more reference templates of objects whose ranges are to be determined. These references are then stored in a memory. The next method step is to compute an Expected Image (EI) from a subsequent image using two types of inputs. The first inputs are the known sensor displacement and known sensor change in orientation that have occurred since selecting the reference template. The second input is the assumed range to the object. The assumed range may be defined with reference to the initial sensor location ($S_1$). Using the EI, the method further includes the steps of relocating the objects in subsequent images by correlating the EI with references or employing other tracking methods. Then, the method entails computing the range using the initial and subsequent object images and known sensor poses (i.e., locations and orientations). Finally, the method includes the steps of using the recently computed range to replace the above assumed range and then iterating the above steps unless the previously assumed range agrees with the computed range within a predetermined tolerance. If the agreement falls within the predetermined tolerance, the method and system of the present invention accept computed range as the estimate of the true range.

Another aspect of the present invention, there is provided a method to generate motion compensated images called Expected Images (EIs) from an original image sequence using the known sensor motion and an assumed range to the object. These EIs are used in a mean-normalized area correlation method to establish a correspondence between the objects that a sensor is to track across an image sequence. This method explicitly makes use of the sensor motion in the feature selection and correspondence processes. As a result, the method and system of the present invention achieve a more reliable and robust correspondence relative to known passive ranging techniques.

Other aspects of the present invention are two iterative methods to estimate the range to the tracked objects. The first method uses the established interframe correspondence across a number of frames to iteratively refine the assumed range to the objects being tracked. This method may be called a point-of-closest-approach or triangulation method. The process continues until the assumed range converges to the true value. The second method uses a correlation coefficient value to refine the assumed range to arrive at the true range. The methods of range estimation of the present invention efficiently give accurate results when tested on a sequence of real aerial images.

A technical advantage of the present invention is that it uses known sensor motion and an optimally derived assumed range to establish an accurate correspondence. The method and system use this correspondence to refine the assumed range to finally arrive at both a reliable correspondence and an accurate range estimate.

Another technical advantage of the present invention is that it provides a method and system that overcomes many of the limitations associated with known passive ranging methods and systems. In particular, the present invention avoids the problems of optic-flow and feature-based passive ranging methods by fully considering the known motion of the sensor. This prevents much of the unreliability and error that exists in the intensity-based and token-based correspondence techniques that these methods employ.

Yet another technical advantage of the present invention is that it may be used to build accurate target tracking and range estimation systems that employ passive ranging and target tracking. Typical applications may include nap-of-the-earth helicopter guidance systems and air-borne autonomous navigation systems.

BRIEF DESCRIPTION OF THE DRAWINGS

The invention in its modes of use and advantages are best understood by reference to the following description of illustrative embodiments when read in conjunction with the accompanying drawings, wherein:

FIG. 8 illustrates the effect of errors in assumed range on the range estimation.

DETAILED DESCRIPTION OF THE INVENTION

The preferred embodiment is best understood by referring to the FIGURES wherein like numeral are used for like and corresponding parts of the various drawings. The preferred embodiment rectifies the drawbacks of traditional methods of target tracking and range estimation by using known sensor motion to predict and regenerate Expected Images (EIs) of the object and then use this EI to establish a correspondence.

Figure 1:
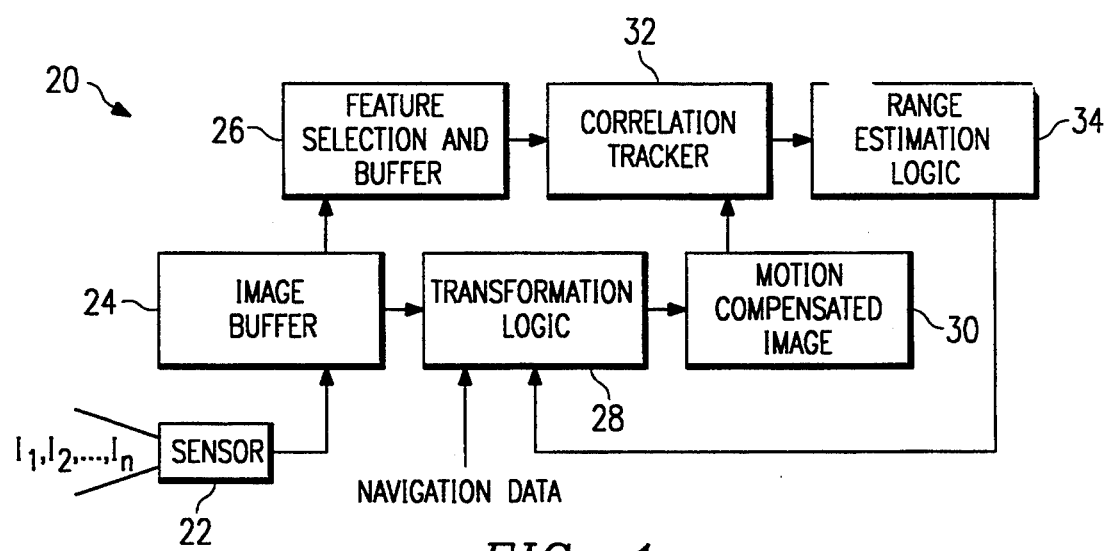
FIG. 1 provides a block diagram of a tracker/range estimator for the preferred embodiment.

FIG. 1 illustrates a block diagram of the iterative ranging/tracking method and system 20 of the preferred embodiment. Sensor 22 receives images $I_1, I_2, \ldots, I_n$. Image buffer 24 stores the sequence of images $I_1, I_2, \ldots, I_n$. Feature selector and buffer 26 selects the templates in the image around the objects to be tracked. The transformation logic 28 uses the known sensor 22 motion between the image frames and an assumed range to the object to generate the motion compensated image or EI 30. Correlation tracker 32 uses an area correlation procedure to locate the template in EI and, hence, to establish the correspondence of the image of the object between the two frames. Range estimation logic 34 uses this correspondence to estimate the range to the object. The procedure works iteratively by feeding the current range estimate to the transformation logic to be used as the assumed range for the next iteration.

Figure 2:
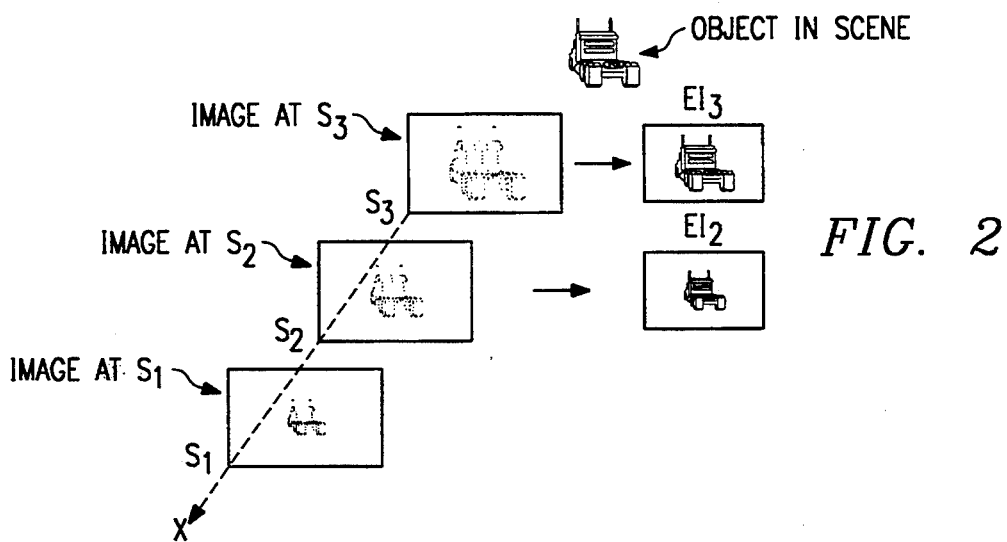
FIG. 2 illustrates conceptually the use of sequential images for image-sequence-based target tracking and range estimation according to the preferred embodiment.

To conceptually understand the approach of the preferred embodiment, refer to FIG. 2. FIG. 2 illustrates a geometrically simple case where the sensor moves along linearly without rotation directly toward the object of interest. Here the rotational matrices are all equal to the identity matrix and may be ignored. The effect of translation is primarily to change the range from the sensor to the object. If the object subtends a narrow field-of-view at the sensor locations, the principal effect is to change the size of the object in the images. Therefore, processing to extract the expected image amounts to reviewing the magnification due to closure. For example, if the distance of $S_i$ to the object is $r_i$, the image at $S_3$ would be demagnified by the ratio, $$r_3/r_1 \quad (1)$$

Once images of the object have been converted to the same size, correlation with the reference template extracted from the image at $S_i$ should be very high.

Of course, the ranges $r_i$, $r_2$ and $r_3$ are initially unknown. Only one must be determined, however, since the relative displacements $T_{1k}$, $=2$, $3$ are known. The range $r_1$ can be determined by assuming a value, computing $r_2$ and $r_3$, extracting $E_{12}$ and $E_{13}$, performing the correlation and re-estimating range by either of the disclosed procedures. For example, using the correlation coefficient method, the correlation coefficient peaks when $r_1$ is near its true value. This allows $r_1$ to be determined by trial-and-error. Processing for more complicated sensor motion is similar.

The example of FIG. 2 may be extended to the more general situation of generating an image sequence $I_1, I_2, \ldots, I_n$ through which it tracks the positions of a set of objects. Sensor locations corresponding to these images may be represented by $S_1, S_2, \ldots, S_n$. Correlation-based techniques extract a template $T_i$ centered around the object $O_l$ from the image $I_l$. These techniques correlate $T_i$ with $I_k$ to establish the position of $O_1$ at the location $S_k$ in the $I_k$ image. The preferred embodiment uses known camera geometry and sensor motion between $S_1$ and $S_k$, as represented by a rotation matrix $R_{1k}$ and a translation vector $T_{1k}$ to estimate the range to the object $O_1$.

The preferred embodiment uses $I_k$ and known sensor motion given by $R_{1k}$ and $T_{1k}$ with $EI_{1k}$ to determine the position of $O_1$. After it establishes the location of $O_1$, the method provides a way to estimate the range of $O_1$. Since the preferred embodiment uses $R_{1k}$ and $T_{1k}$ to generate $EI_{1k}$, $EI_{1k}$ is more similar to $I_1$ than $I_k$. Thus, correlating $T_1$ with $EI_{1k}$ gives a more reliable estimate of the location of $O_1$ in the image $I_k$. This method may be used across the image sequence i.e., using $I_n$ and $(R_{1n}, T_{1n})$ to generate $E_{1n}$ and use $E_{1n}$ instead of $I_n$ to establish the correspondence with $I_1$.

Rarely is it possible to exactly reconstruct the image $EI_{1n}$, given Just $I_1$, $I_n$ and sensor motion since to do so would require knowledge of the 3-dimensional scene structure, including regions that may not be initially visible, changing lighting conditions, etc. If the range of the object $O_1$ is large compared to its dimensions, however, it is practical to assume that the visible points on the object $O_1$ line on a plane $\Omega$. The orientation of the plane is assumed to be normal to the line of sight (LOS) at the sensor location $S_1$ where $I_1$ was imaged. This assumption models the reality quite well for a certain length k of the sequence. After this, if the sensor motion is significant parts of the object that were not visible before in the original image $I_1$ begin to appear. The preferred embodiment iteratively updates the template to be $T_k$ (extracted form the image $I_k$) and the image to establish correspondence with $I_k$. Even though the method may require template updates as in the previous methods, the life of the template is much longer. Tests indicate a three-fold increase in the life of the template is feasible.

In prior image reconstruction methods, it is necessary to know the range of the plane $\Omega$ from the sensor position $S_1$. This is essentially the range to the object $O_1$ of interest after establishing the correspondence.

The preferred embodiment uses an iterative procedure that hypothesizes a certain range to the plane $\Omega$ from the sensor. The method uses this to iteratively establish the correspondence, estimate the range using the correspondence, and refine the range estimate. This method finally converges to the best range estimate. Since the method uses the range of one object $O_1$ only to define the plane $\Omega$, the method exactly corrects only this object's motion in the generated EI. To track multiple objects, therefore, it is necessary to repeat the procedure for each of the objects.

The preferred embodiment establishes the location in the EI corresponding to the template $T_l$. Then, it is possible to transform this location to the image $I_k$, (using the inverse of the motion transform given by $R_{1k}$ and $T_{1k}$) to get the corresponding location. Thus, there are two images from two known sensor positions $S_1$ and $S_k$ and two corresponding locations in the image planes. This information is useful to estimate the range to the object that corresponds to the image plane locations.

The preferred embodiment also provides an effective method to estimate the range using the image correspondences. The method hereinafter, called either the point-of-closest-approach or triangulation method, projects two rays from the two sensor locations through the image plane points and determines the point-of-closest-approach of these two rays. The range of this point gives the range to the object. When there are multiple sightings of the object (corresponding points at various sensor locations), the method develops a weighted least squares technique to combine this data into a more reliable range estimate.

It is observed that the correlation coefficient of the result of correlating the template with the EI peaks when the assumed range to the object is the true range. This suggests the use of the correlation coefficient in the range estimation process. Another aspect of the preferred embodiment is, therefore, a method to estimate the range to the object using the correlation coefficient.

Figure 3:
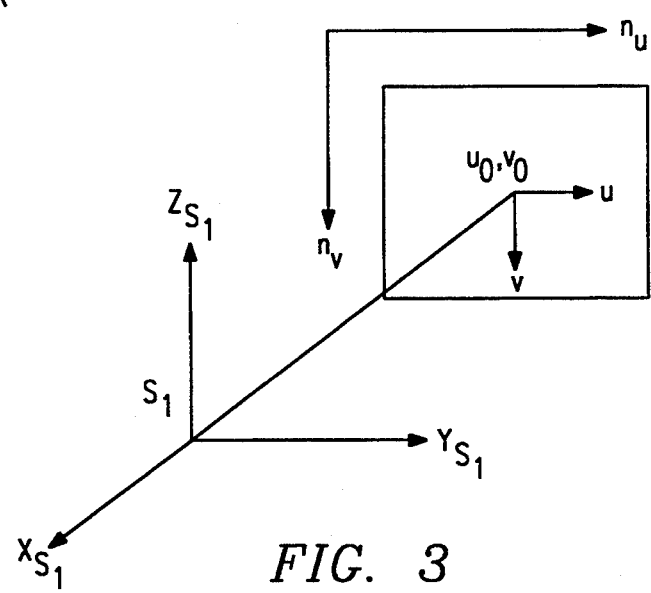
FIG. 3 illustrates the sensor geometry applicable to the preferred embodiment.

FIG. 3 illustrates the sensor geometry for generating an Expected Image. Consider a right-handed world coordinate system (WCS) $OX_wY_wZ_w$ with $X_w$ pointing in a north direction, $Y_w$ pointing east and $Z_w$ pointing to the center of the earth. Let $OX_{si}$, $Y_{si}$, $Z_{si}$, be the sensor coordinate system ($SCS_i$) at the sensor location $S_i$. Let the transformation that takes the WCS into $SCS_i$ be given by a translation vector $\vec{T}_{WS_i}$ followed by a rotation matrix $[R_{WS_i}]$. Thus, if $\vec{p}' = (x_{si}, Y_{si}, Z_{si})$ is a point in $SCS_i$ and $\vec{p} = (x_w, y_w, z_w)$ is its image in the WCS, then $$\vec{p}' = [R_{WS_i}](\vec{p} + \vec{T}_{WS_i}), \quad (2)$$

or $$\vec{p} = [R_{S_iW}]\vec{p}' + \vec{T}_{S_iW}, \quad (3)$$

where $$\vec{T}_{S_iW} = -\vec{T}_{WS_i}, \quad (4)$$

and $$[R_{S_iW}] = [R_{WS_i}]^{-1} = [R_{WS_i}]^T. \quad (5)$$

Euler angle terms define the matrix $[R_{WS_i}]$. The terms are the heading angle $\psi$, attitude angle $\theta$, and the bank angle $\phi$. The rotation sequence is $\psi$ about the Z-axis, $\theta$ about the Y-axis, followed by $\phi$ about the X-axis, where all the rotations are considered positive in the right-handed sense. The resulting rotation matrix is given by $$[R](\psi, \theta, \phi) = \begin{bmatrix} \cos\psi\cos\theta & \sin\psi\cos\theta & -\sin\theta \\ \cos\psi\sin\theta\sin\phi - \sin\psi\cos\phi & \sin\psi\sin\theta\sin\phi + \cos\psi\cos\phi & \cos\theta\sin\phi \\ \cos\psi\sin\theta\cos\phi + \sin\psi\cos\phi & \sin\psi\sin\theta\cos\phi - \cos\psi\sin\phi & \cos\theta\cos\phi \end{bmatrix} \quad (6)$$

Given the sensor position $S_i$ in the WCS as $(X_{sw}, Y_{sw}, Z_{sw})$ and the attitude of the sensor by its three Euler angles $(\psi_{sw}, \theta_{sw}, \phi_{sw})$, it is practical to compute the rotation matrix $[R_{WS_i}]$ from Equation (5) and the translation vector as $\vec{T}_{WS_i} = (-X_{sw}, -Y_{sw}, -Z_{sw})^T$.

Let the image plane be oriented along the rows and columns of the sensor array. Let the vector u point along the rows and v along the columns. The image plane axes originate at the image center, given by ($u_o$, $v_o$), where the optical axis meets the image plane. The pixel coordinates $n_u$ and $n_v$ originate at the upper left hand corner and run in the same direction as the vectors u and v. If the aspect ratio is given by AR and the focal length of the lens expressed in pixels is given by f, then, the following equations give the coordinates of a point ($n_u$, $n_v$) in the sensor co-ordinate system $$x_{si} = f, \quad (7)$$

$$y_{si} = (n_u - u_o)AR, \quad (8)$$

and $$z_{si} = (n_u - v_o). \quad (9)$$

Figure 4:
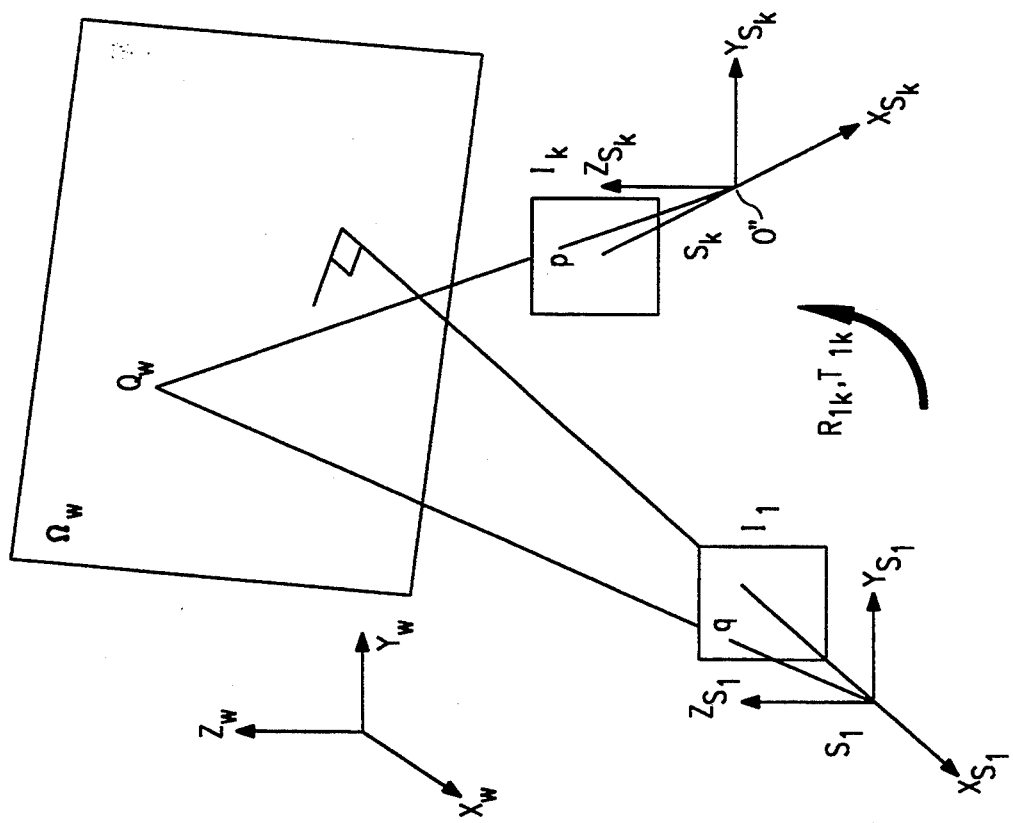
FIG. 4 illustrates the geometry of image generation according to the preferred embodiment.
Figure 6:
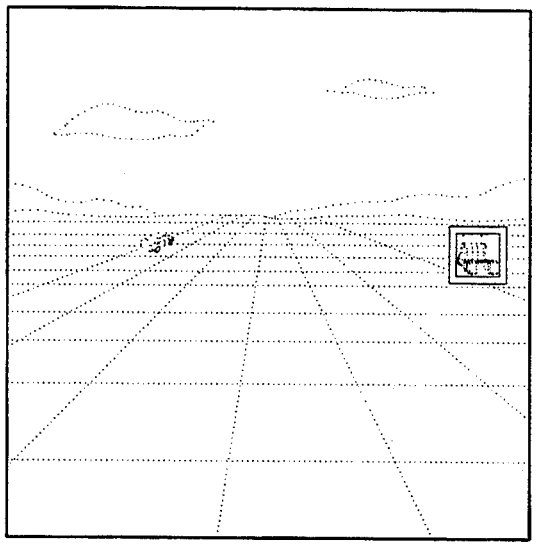
FIGS. 6–10 show images using the preferred embodiment.
Figure 7:
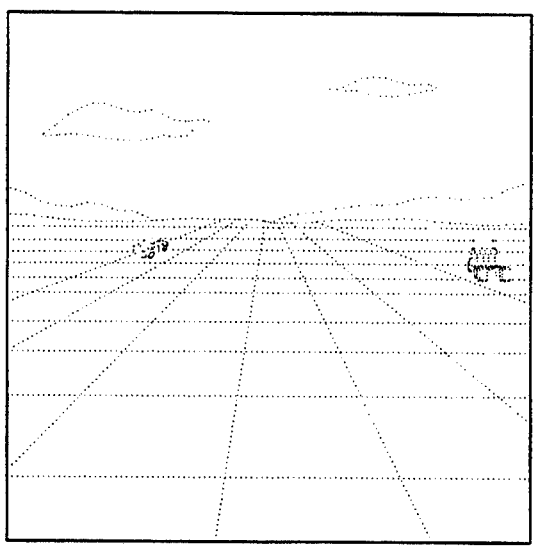
Figure 8:
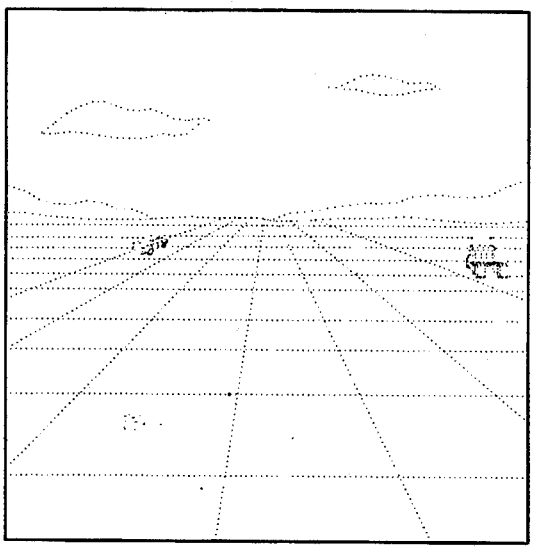
Figure 9:
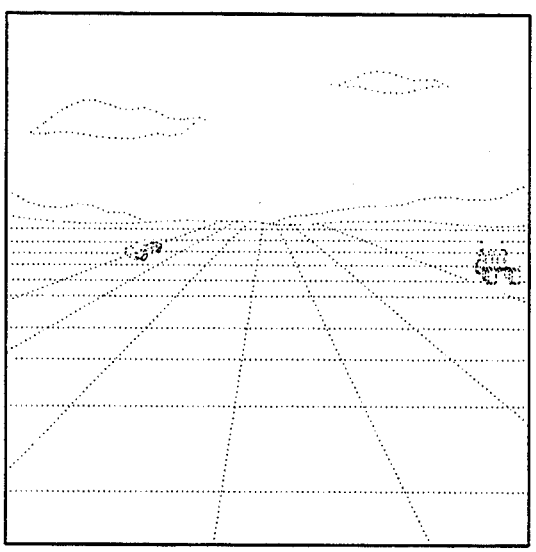

FIG. 4 illustrates the geometry for the image generation process. Given two sensor positions, $S_1$ and $S_k$, and the images, $I_1$ and $I_k$, at these locations, the preferred embodiment includes a method to generate the Expected Image, $EI_{1k}$ from $I_k$. Let O'' be the origin of the coordinate system at $S_k$. Consider a point $p(n_u, n_v)$ in the image plane $I_k$. Equation (6) forms the $SCS_k$ co-ordinates of $p(n_u, n_v)$ as P''. Considering the line $L_{Sk} = O''P''$, and transforming this into the WCS using Equation (2) results in the line $L_w$ of FIG. 3. Let $\Omega_{S1}$ represent a plane in the $SCS_k$ at an assumed range $d_x$ from the sensor location $S_1$ and normal to the line-of-sight (LOS) at $S_1$. Assume this plane to contain the object points. The point-normal form adequately represents this plane.

Figure 10:
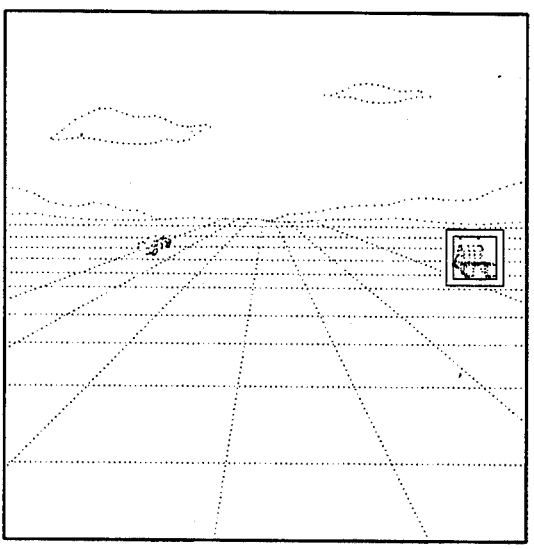
Figure 11:
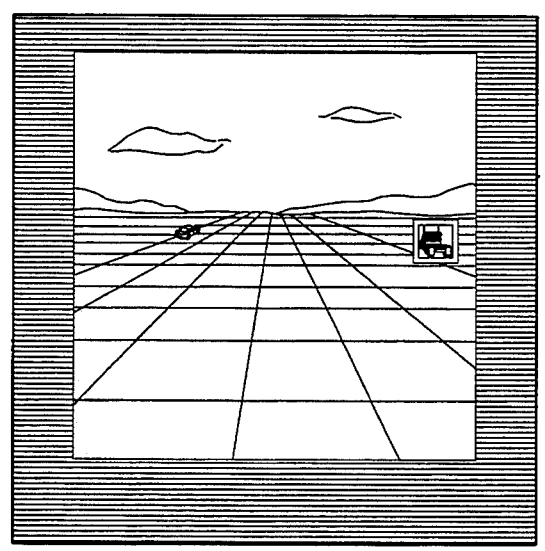
FIGS. 11–13 illustrate expected images according to the preferred embodiment.
Figure 12:
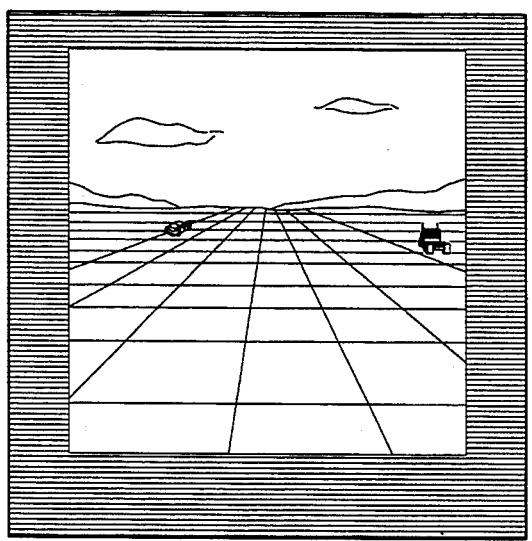

Equation (2) transforms the plane into the WCS as $\Omega_w$. The intersection of $L_w$ and the plane $\Omega_w$ is designated $Q_w$ in FIG. 3. Equation (1) now transforms $Q_w$ into the $SCS_1$, as $Q_{S1}$, ($X_{s1}$, $Y_{s1}$, $Z_{s1}$). Using perspective projection, the image of this point in the image plane at $S_1$ is given as $q(n_u, n_v)$ where The method of the preferred embodiment is to repeat this procedure for all pixels $p(n_u, n_v)$ in the image plane $I_k$. This forms the necessary motion compensated image $EI_{1k}$ $$n_u = u_o + \frac{y_{Si}}{x_{Si}} fAR \quad (10)$$

$$n_u = v_o + \frac{z_{Si}}{x_{S1}} f$$

at $S_k$. This procedure may not, however, fill all pixels in the image $EI_{1k}$ from the image $I_k$. To keep the image $EI_{1k}$ the same size as $I_1$ using this procedure, all the unfilled pixels are set to black. FIGS. 10–12 (below) show how this may appear in the EI. Note that the sensor motion between the two frames $I_1$ and $I_k$ is the independent known parameter expressed as sensor position and orientation in the WCS at the two locations $S_1$ and $S_k$.

Once the method and system are used to generate $EI_{1k}$ from $I_k$, an area correlation technique can establish the location of the object in $EI_{1k}$. The following discussion describes an appropriate correlation technique for the purposes of the preferred embodiment. Let B represent a template containing the object $O_1$ in the image $I_1$. Let A be the expected image $EI_{1k}$. The correlation algorithm of the preferred embodiment removes the effects of bias offset (i.e., mean) and contrast (i.e., energy) differences. Applying the correlation algorithm, therefore, yields a "mean/energy-normalized" correlation between A and B.

The mean/energy-normalized correlation between A and B may be defined as follows:

For $$B = B(i,j); \quad A = A(i,j) \tag{11}$$

for $i = 1, 2, \ldots, N; j = 1, 2, \ldots, M$, the correlation takes the $$\rho = \frac{MN\mu_{ab} - \mu_a\mu_b}{\sqrt{MN\sigma_a^2 - \mu_a^2}\sqrt{MN\sigma_b^2 - \mu_b^2}}, \tag{12}$$

where $$\mu_a = \sum_{i=1}^{N}\sum_{j=1}^{M} A(i,j), \tag{13}$$

$$\mu_b = \sum_{i=1}^{N}\sum_{j=1}^{M} MB(i,j),$$

$$\mu_{ab} = \sum_{i=1}^{N}\sum_{j=1}^{M} A(i,j)B(i,j),$$

$$\sigma_a = \sum_{i=1}^{N}\sum_{j=1}^{M} A^2(i,j), \text{ and}$$

$$\sigma_b = \sum_{i=1}^{N}\sum_{j=1}^{M} B^2(i,j)$$

The size of the template (M,N) is taken to be odd. B is moved all over $EI_{IR}$ such that A assumes all possible, (M, N) arrays in the search area and the value of $\rho$ is computed at each position of B. A value of 1.0 indicates a perfect match between the two regions. The mean-normalized correlation coefficient has the important property that the correlation value is independent of the linear brightness changes from one region to the other. corresponding to the highest value $\rho$ may be taken as the best estimate of the position of the object $O_1$ in the expected image $EI_{1k}$.

To make the approach more robust, however, sub-pixel accuracy in the pixel location is necessary. To achieve this, after locating the pixel position corresponding to the maximum value of $\rho$, a second order surface is fitted to the correlation coefficient values in a 3-by-3 window about this pixel. The next step is to evaluate the peak of this surface by evaluating the partial derivatives with respect to i and j and setting them to zero. The location of the peak of this correlation surface is then taken to be the best estimate of the object location on the expected image.

The method of preferred embodiment may employ one or both of two different methods of estimating the range of the object from the sensor. The first method uses the established correspondence between the image frames to estimate the range. The second method uses the correlation coefficient and searches for the true range. Experiments with a sequence of helicopter images show the range estimations using these methods to be of comparable accuracy. However, the correlation coefficient method is less computational intensive.

Figure 5:
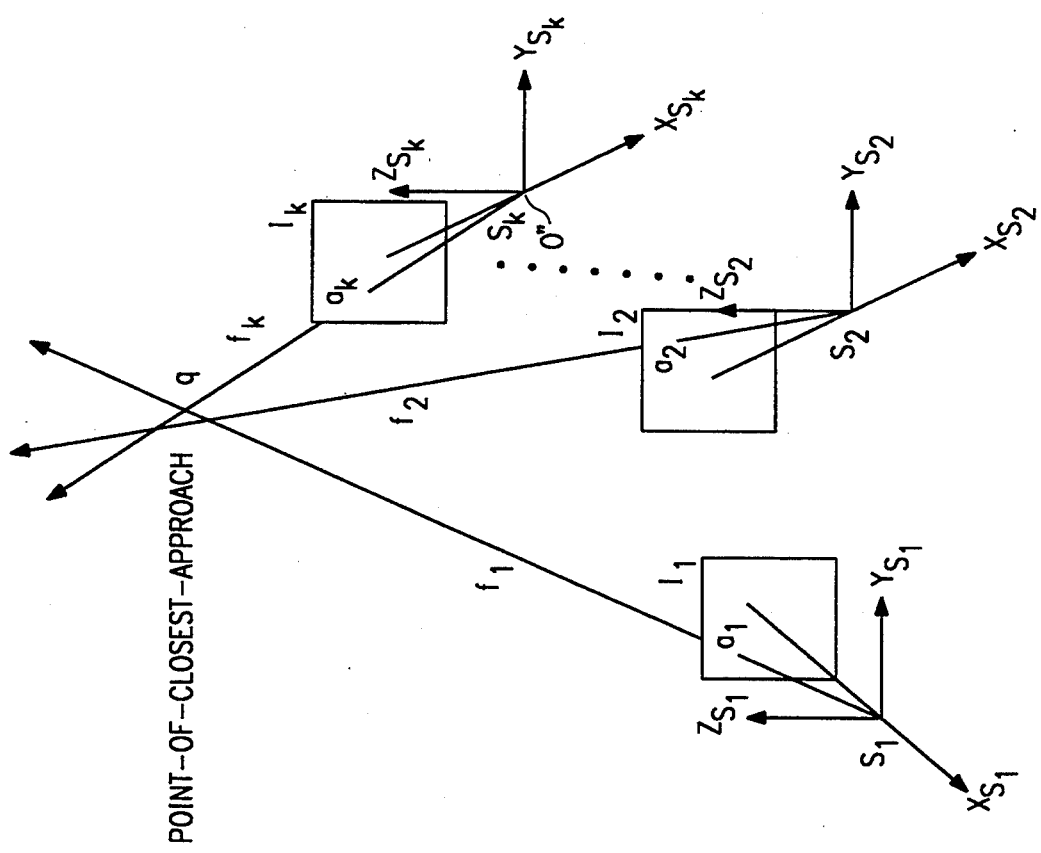
FIG. 5 shows the range estimation method by the point-of-closest-approach for the preferred embodiment.

FIG. 5 and Equations (9) through (24) describe range estimation using the point-of-closest-approach method according to the preferred embodiment. Given a pair of images $I_1$ and $I_k$ at sensor locations $S_1$ and $S_k$, respectively, and the known motion transformation between the two sensor locations by $R_{1k}$ and $T_{1k}$, it is possible to compute the Expected Image at $S_1$ as $EI_{1k}$, also employing $I_k$ and an assumed range to the object r for this purpose. The method involves correlating the template $T_1$, centered around the pixel location $a_1$, and containing the object O with this $EI_{1k}$, to determine the pixel location corresponding to the correlation peak as the location of the object in $EI_{1k}$. Once this location is identified, using the inverse of the motion transformation between $S_1$ and $S_k$, the method computes the pixel location $a_k$ in $I_k$ that corresponds to the object O. Thus, there is a correspondence between two pixel locations $a_1$ and $a_k$ in the images $I_1$ and $I_k$ at the two known sensor locations $S_1$ and $S_k$.

One way to find the range of the object O from the sensor is to consider two lines drawn from the sensor locations $S_1$ and $S_k$ through the pixel locations $a_1$ and $a_k$ and find their intersection. To account for the inaccuracies in the procedure that establishes the correspondence, it is necessary to compute the point of closest approach of these two lines. Let the range estimated by this procedure be denoted by $r_{est}$. The details of the derivation of the point of closest approach of two three-dimensional lines is given below. The method of the preferred embodiment modifies the assumed range r to be the estimated range $r_{est}$ and iterates until convergence occurs between r and $r_{est}$.

An example of this method may be understood in the example of the point-of-closest-approach method using two three-dimensional lines. Let $L_1: \vec{a} + \alpha\vec{f}$ and $L_2: \vec{b} + \beta\vec{g}$ represent the two three-dimensional lines in point normal form, where $\vec{a} = [a_x, a_y, a_z]^T$, and $\vec{b} = [b_x, b_y, b_z]^T$ are two points in the WCS, while $\vec{f} = [f_x, f_y, f_z]^T$, and $\vec{g} = [g_x, g_y, g_z]$ are unit vectors aligned with rays from the sensor locations to the object and $\alpha$ and $\beta$ are two scales. If the distance between the two lines is represented by $\epsilon$. then $$\epsilon^2 = \|L_1 - L_2\|^2 = \|\vec{a} - \vec{b} + \alpha\vec{f} - \beta\vec{g}\|^2 \tag{9}$$

At the point of closest approach of these two lines, $$\frac{\partial \epsilon^2}{\partial \alpha^2} = 0 \tag{10}$$

$$\frac{\partial \epsilon^2}{\partial \beta} = 0$$

From Equations (9) and (10), $$\begin{bmatrix} \vec{f}^2 & (-\vec{f} \cdot \vec{g}) \\ (-\vec{f} \cdot \vec{g}) & \vec{g}^2 \end{bmatrix} \begin{bmatrix} \alpha \\ \beta \end{bmatrix} = \begin{bmatrix} -\vec{f} \cdot \vec{\mu} \\ \vec{\mu} \cdot \vec{g} \end{bmatrix} \tag{11}$$

where $\vec{u} = \vec{a} - \vec{b}$. Equation (11) is a linear system and can be solved for $\alpha$ and $\beta$. Note that $\alpha$ represents distance from $\vec{a}$ of the point on $L_1$ which is closest to the Line $L_2$. This is the desired range.

The two-line approach may be expanded to an "n-line" point of closest approach of n lines. The correspondence of an object among a sequence of n images is established using the above correlation-based technique. Instead of using just two lines, it is possible to more accurately estimate range by combining observations of n-lines. FIG. 5, for example, shows k lines arising from the point correspondences between the k frames. The iterative range estimation algorithm remains essentially the same except that at each stage instead of using just two frames to estimate the range the method uses k frames. The following describes a method which computes the range to a point using these k lines and combining them using a least squares procedure.

Let the k lines of FIG. 5 be represented in the point normal form as $L_1$: $\vec{a_1} + a_1\vec{f_1}$ for all lines $L_i$, $i = 1, 2, \ldots, k$ and where $\|\vec{f_1}\|^2 = 1$. Let $\vec{q} = [q_x, q_y, q_z]^T$ be the point of closest approach of the k lines. If the distance from the line $L_1$ to $\vec{q}$ is denoted by $\delta$, then $$\delta^2 = \|\vec{q} - \vec{a_1} - \vec{a}\vec{f_1}\|^2. \tag{12}$$

If $\alpha_1$ is the $\alpha_1$ that minimizes $\delta^2$, then $$\frac{\partial \delta^2}{\partial \alpha_1} = -2\vec{f_1} \cdot (\vec{q} - \vec{a_1} - \hat{\alpha}_1\vec{f_1}) = 0. \tag{13}$$

Thus, $\alpha_1 = \vec{f_1} \cdot (\vec{q} - \vec{a_1})$ and $L_1: \vec{a_1} + \vec{f_1} \cdot (\vec{q} - \vec{a_1})\vec{f_1}$ or $$\hat{\delta}^2 = \|\vec{q} - \vec{a_1} - f_1 \cdot (\vec{q} - \vec{a_1})\vec{f_1}\|^2 \tag{14}$$

$$= \|\vec{q} - \vec{a_1}\|^2 - <\vec{q} - \vec{a_1}, \vec{f_1}>^2, \tag{15}$$

where $(\vec{x}, \vec{y})$ denotes $\vec{x} \cdot \vec{y}$. $\hat{\delta}$ can be regarded as the perpendicular distance of line $L_1$ to point $\vec{q}$ and is the closest approach of $L_1$ to $\vec{q}$. Now, with k lines, $\vec{q}$ may be found so that $$J = \frac{1}{k} \sum_{i=1}^{k} [\|\vec{q} - \vec{a_i}\|^2 - <\vec{q} - \vec{a_i}, \vec{f_i}>^2] \tag{16}$$

is a minimum. Thus, $$\nabla_{\vec{q}} J|_{\vec{q} = \hat{q}} = 0 \tag{17}$$

Evaluating the gradient, $$\nabla_{\vec{q}} J = \frac{2}{k} \sum_{i=1}^{k} ([I] - \vec{f_i}\vec{f_i}^T)(\vec{q} - \vec{a_i}) \tag{18}$$

where $[I]$ is the identity matrix. Let $$[F_i] = [I] - \vec{f_i}\vec{f_i}^T \tag{19}$$

and $$[\bar{F}] = \frac{1}{k} \sum_{i=1}^{k} [F_i] \tag{20}$$

Then, setting the gradient equal to the null vector, $\vec{0}$, $$\vec{r} = \frac{1}{k} \sum_{i=1}^{k} [F_i]\vec{a_i} \tag{21}$$

$$[\bar{F}]\vec{q} = \vec{r}, \tag{22}$$

which is a linear system that may be solved for $\vec{q}$, the point of closest approach of any point to the entire ensemble of lines in the sense of least squares. Note that the normalization by $k$ is optional provided $[F]$ and $r$ are treated consistently.

As the sensor moves further away from the initial position and closer to the object, the assumption that all the object points lie in a plane starts to break down. New structure of the object which was not visible in previous frames may then appear. Hence, the generated EI will start to be less similar to the original image. As a result, the correlation tracker output (See FIG. 1) begins to drop and the established correspondence using this method becomes less reliable.

A weighted least-squares estimation procedure in the range estimation is useful to account for these effects. Since the value of the correlation coefficient is a good measure of the mismatch between the images, this value is used in the weight generation. Experiments show that using a weight $w_i = \rho_i^3$, where $\rho_i$ is the correlation coefficient associated with the ith image proves to be quite effective. Data with $w_i > 0$ are not processed. However, negative values of the correlation coefficient are unlikely.

To form the weighted least-squares estimate, Equation (16) may be modified to be $$J = \frac{1}{k} \sum_{i=1}^{k} w_i [\|\vec{q} - \vec{a_i}\|^2 - <\vec{q} - \vec{a_i}, \vec{f_i}>^2]. \tag{23}$$

Propagating the weights through, $[F_i]$ in Equation (20) becomes $$[F_i] = w_i([I] - \vec{f_i}\vec{f_i}^T) \tag{24}$$

Also, if the sensor positions corresponding to the lines used in the range estimation are close to each other, the range estimated by the point of closest approach is not very reliable. To account for these in our experiments the preferred embodiment only considers those sensor positions that are a certain threshold distance away from the initial position.

In addition to the point-of-closest-approach method of range estimation, the preferred embodiment may also employ a correlation-based range estimation method. In this alternative method, an assumed range to the object $r$ is used to generate the EI. Experiments show that the generated EI is most similar to the original image when the assumed range is closest to the true range of the object. This is quantified by the value of the correlation coefficient when the template containing the object is correlated with the EI. This suggests the use of the correlation coefficient as a guide to search for the true range of the object. The procedure assumes a certain range $r$ to the object, generates the EI evaluates the correlation coefficient, and updates the assumed range so that the correlation coefficient peaks. The direction and the increments to the assumed range can be determined by observing the change in the correlation coefficient as the assumed range sweeps through different values. However, this method of range estimation may be computationally more expensive than the previous method.

Figure 13:
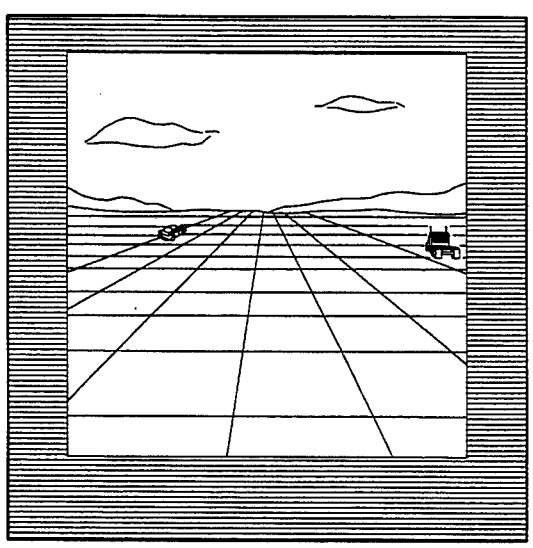

The methods to track and estimate ranges of the preferred embodiment have been tested on real image sequences. The data consists of a sequence of images taken from a helicopter flying at a low altitude over a set of stationary trucks on an airport runway. The data consists of ten images each separated in time by 0.3 seconds. In this image sequence, the helicopter is flying in approximately along a line to the trucks. FIGS. 6-10 show four of the images of the sequence taken by the helicopter at locations $S_1$, $S_3$, $S_5$ and $S_7$, respectively. The location of the helicopter and the sensor at these locations is known a priori. The white square in FIG. 6 denotes the correlation template $T_i$. The truck enclosed in the white square is at a true range of 272.6 feet from the sensor. FIGS. 11 through 13 show the motion compensated EIs using a plane at the true range of this truck along the line-of-sight. That is, FIG. 10 indicates the image generated from $I_3$ using the known sensor motion between $S_3$ and $S_1$ as the image that would be seen at $S_1$. Similar results appear in FIGS. 12 and 13.

As can be seen from the images of FIGS. 10 through 12, the motion compensation transforms the truck back to its right size, shape and orientation at $S_1$. The black areas in the images arise due to the fact that, since not all pixels in the EIs are filled by the image from $S_k$. To keep the EIs to be of the same size as the original image, the pixels that are not filled are set to black.

Figure 14:
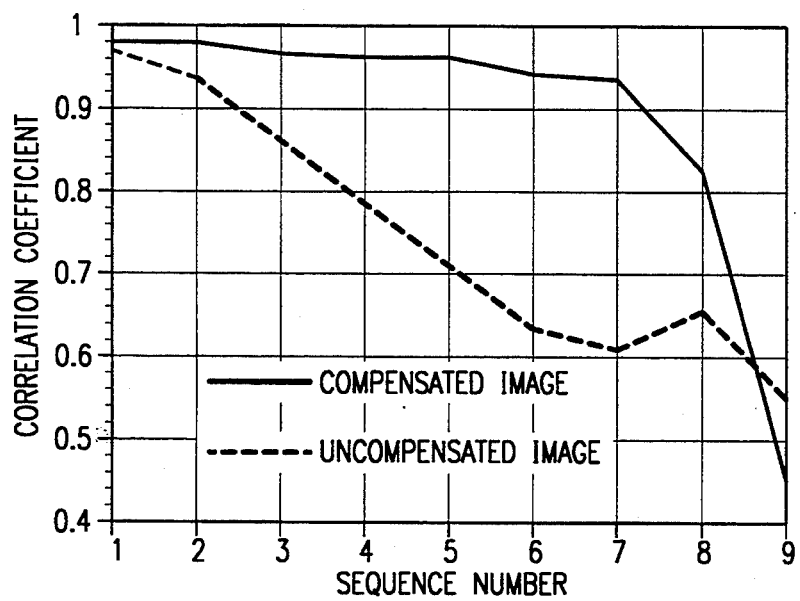
FIG. 14 plots correlation coefficients for different images and a sequence.

FIG. 14 illustrates the effects of the motion compensation on the correlation coefficient. Here, the template is correlated with the various images in a sequence and the value of the correlation coefficient is plotted. Also plotted are the values of the correlation coefficient when correlated with the motion-compensated images. As can be seen from the plot, the coefficient is much higher for the compensated images and remains higher for a greater part of the sequence. Toward the tail of the sequence, the truck is out of the field of view of the sensor and, hence, the coefficient is low in both cases. This curve illustrates the fact that this method of motion compensation prolongs the life of the template significantly and results in more reliable tracking.

Figure 15:
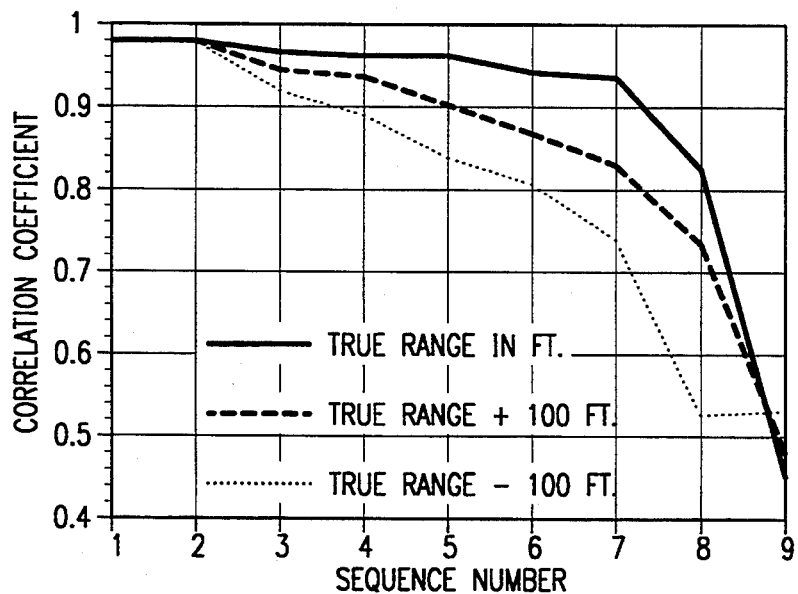
FIG. 15 shows the effects of errors in estimated range on the correlation coefficient over a sequence of nine (9) images.

FIG. 15 shows a plot of the correlation coefficient versus sequence number with the range of the plane $\Omega$ as a parameter. As can be seen in FIG. 14 the correlation coefficient is higher when the plane is assumed to be at the true range to the object of 272.6 feet. This suggests the use of the correlation coefficient in the range estimation process.

Figure 16:
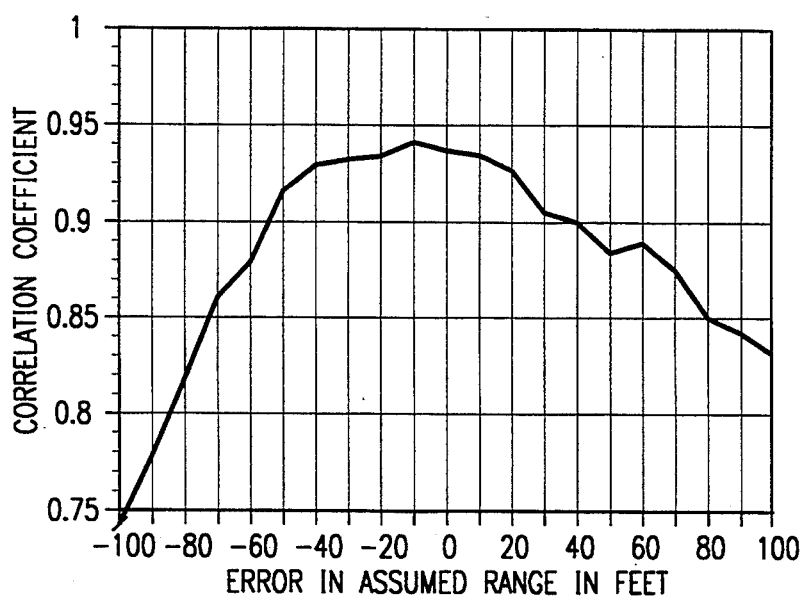
FIG. 16 shows the effects of errors in estimated range on the correlation coefficient on a single image.

FIG. 16 shows a plot of the correlation coefficient versus the error in the assumed range of the plane. Here the EI at $S_1$ is generated using the image at $S_7$. FIG. 16 illustrates that the correlation coefficient peaks when the assumed range is close to the true range. This suggests that it is possible to estimate the true range to the object iteratively by assuming a range for a plane, compensating the image, and computing the correlation coefficient peaks. FIG. 16 also illustrates that the correlation coefficient falls rapidly as the assumed range gets much smaller compared to the true range. The rate of fall of the coefficient as the assumed range gets larger than the true range is not as steep. This suggests that it is better to initially overestimate the range and then converge to the true range iteratively.

Figure 17:
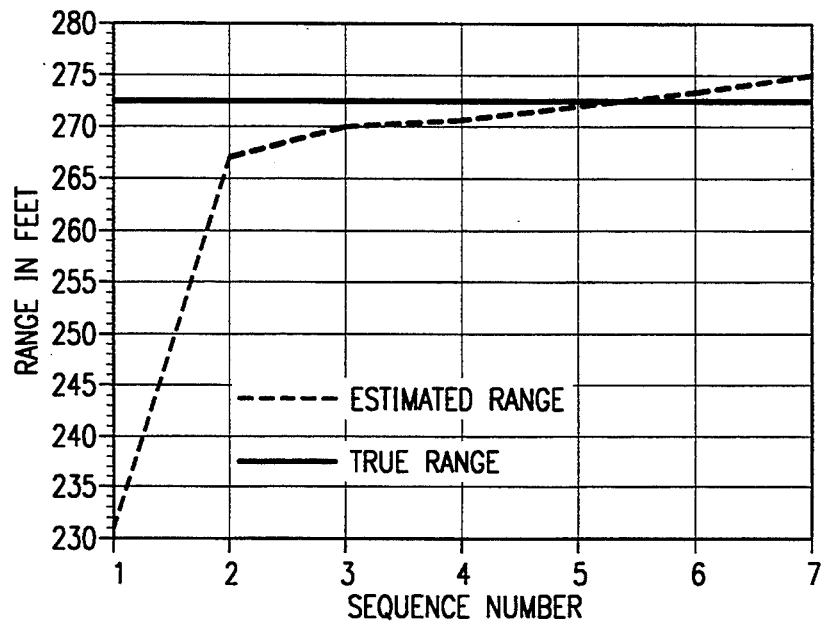
FIG. 17 shows experimental ranging performance over a sequence of seven (7) images.

FIG. 17 shows a plot of the estimated range versus the sequence number using the point of closest approach method applied to two images. As can be observed, the range estimate gets more accurate as the sequence number grows. This is because, with increasing sequence numbers the distance between the current and the reference sensor position becomes larger. This causes the base line to increase. The two projected rays, therefore, have a greater angular separation between them. This yields a more reliable and accurate range estimate.

When the point-of-closest-approach method is applied using all the ten frames in the sequence in a weighted least squares, the range estimate turns out to be about 3 feet away from true value. The weights used were the cube of the correlation coefficient.

Figure 18:
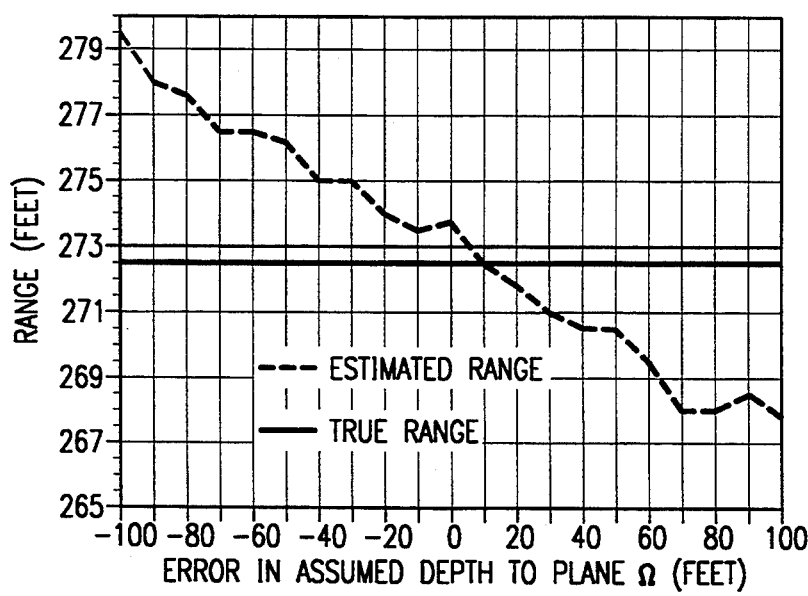

FIG. 18 shows the effects of the error in the assumed depth of the plane $\Omega$ on the range estimate. It can be observed that the range estimate is most accurate when the assumed depth is close to the true depth. This suggests an iterative estimation procedure that assumes a depth of the plane $\Omega$, generates the motion compensated image, determines the location of the object using a correlation template, transforms this location into the second image frame, uses the point of closest approach to estimate the depth, and then uses this depth estimate to refine the assumed plane depth and iterate till it converges. From the shape of the curve it can be seen that such a depth estimation procedure converges to a range which is quite close to the true range.

In FIG. 18, the true range to the object is 272.6 feet. The convergence of the iterative range estimation algorithm can be explained as follows. Assume that the object is at a range of 350 feet, i.e., a range error of 7.4 feet, the estimated range from the curve is about 268 feet, which is off from the true range by less than 5 feet. This indicates the fast rate of convergence of the algorithm.

In summary, the preferred embodiment includes a method to track objects across a sequence of images. In the method, the motion of the sensor between the images is used to transform the images and generate Expected Images or EIs. These EIs serve to establish a reliable correspondence between object images and aid the sensor system to track the objects of interest. A mean-normalized area correlation method is used to establish the inter-frame correspondence. Once this correspondence is established, two methods are used to estimate the range to the objects. This method of tracking the objects and estimating their range to the sensor is more reliable and robust than the existing correlation based methods.

Various modifications of the disclosed embodiment, as well as alternative embodiments of the present invention will become apparent to persons skilled in the art upon reference to the above description. It is therefore, contemplated that the appended claims will cover such modifications that fall within the true scope of the invention.

WHAT IS CLAIMED IS:

1. A method for determining the range of an object using an imaging sensor and a motion sensor, comprising the steps of:
   taking an initial image,
   selecting from said initial image a reference template about an object whose range is to be determined,
   taking a subsequent image including said object,
   computing an expected initial image from said subsequent image using known sensor orientation and displacement change since selecting said reference template, and
   determining the range of the object using correlation between said reference template and said expected initial image.

2. The method of claim 1 wherein said determining step includes the step of correlating said reference template from said initial image with the expected initial image to determine the location of said object in the expected image.

3. The method of claim 2 wherein said determining step includes the steps of:
   finding location of said object in said subsequent image using known sensor motion and location of said object in said expected image,
   projecting a first ray from a first position of the imaging sensor through said reference template and projecting a second ray from a second position of the imaging sensor through said location of said object in said subsequent image;
   and determining the closest point of approach of said first ray to said second ray as the first determined range.

4. The method of claim 3 wherein said determining step above including the step of using the first determined range to replace the assumed range and then iterating the above steps unless the previously assumed range agrees with the computed range within a predetermined tolerance until the computed range falls into agreement within a predetermined tolerance.

5. The method of claim 2 wherein said determining step comprises the step of correlating first using an assumed range to get an initial value or correlation coefficiency and then with changes in range values on either side of said assumed range values of correlation coefficiency as a function said range values.

6. The method of claim 5 further comprising the step of selecting as said determined range the range occurring at the point of greatest correlation between said expected initial image and said sensed initial image.

7. An improved passive range determining system for determining the range to an object comprising:
   an image sensor for sensing said object,
   a motion sensor for sensing sensor orientation and displacement,
   means coupled to said sensor for selecting from an image from said sensor a reference template about said object whose range is to be determined,
   said motion sensor being operated to take an initial image and a subsequent image of said object,
   circuitry for computing an expected initial image from said subsequent image using sensed orientation and displacement change from said initial image to said subsequent image, and
   circuitry for determining the range to said object using correlation between said reference template and said expected initial image.

8. The system of claim 7 wherein said circuitry for determining includes circuitry for correlating said reference template from said initial image with the expected initial image to determine the location of said object in said expected initial image.

9. The system of claim 8 wherein said circuit for determining includes circuit for determining the closest point of approach of a first ray projecting from a first position of the imaging sensor through said reference template and a second ray from a second position of said imaging sensor through said location of said subsequent initial image.

10. The system of claims 8 wherein said circuit for determining includes circuitry for providing range as a function of correlation coefficient of said expected initial image and said sensed initial image.

11. The system of claim 10 wherein said circuit for determining includes circuitry for selecting as said range the range occurring at the point of greatest correlation between said expected image and said sensed image.

* * * * *